United States Patent
Nagahama et al.

(10) Patent No.: US 9,024,496 B2
(45) Date of Patent: May 5, 2015

(54) ROTOR FOR MOTOR AND METHOD OF MANUFACTURING THE SAME

(71) Applicant: JTEKT Corporation, Osaka-shi (JP)

(72) Inventors: Takaya Nagahama, Obu (JP); Masami Naka, Yamatokoriyama (JP); Kouji Kitahata, Minamikawachi-gun (JP); Yoshiyuki Shibata, Toyota (JP); Shigeki Nagase, Nabari (JP); Takashi Kageyama, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 240 days.

(21) Appl. No.: 13/686,498

(22) Filed: Nov. 27, 2012

(65) Prior Publication Data
US 2013/0134817 A1 May 30, 2013

(30) Foreign Application Priority Data
Nov. 30, 2011 (JP) .................................. 2011-261351

(51) Int. Cl.
| | |
|---|---|
| *H02K 21/12* | (2006.01) |
| *H02K 1/28* | (2006.01) |
| *H02K 1/27* | (2006.01) |
| *H02K 15/00* | (2006.01) |
| *H02K 15/03* | (2006.01) |

(52) U.S. Cl.
CPC .. *H02K 1/28* (2013.01); *H02K 1/27* (2013.01); *H02K 15/00* (2013.01); *Y10T 29/49012* (2015.01); *H02K 1/276* (2013.01); *H02K 1/278* (2013.01); *H02K 15/03* (2013.01)

(58) Field of Classification Search
USPC .................. 310/156.01–156.84; 29/596, 598
See application file for complete search history.

(56) References Cited

U.S. PATENT DOCUMENTS

| | | | | |
|---|---|---|---|---|
| 5,258,678 | A * | 11/1993 | Futami .................... | 310/156.53 |
| 8,692,432 | B2 * | 4/2014 | Kingrey et al. ......... | 310/156.53 |
| 8,819,921 | B2 * | 9/2014 | Adachi .................... | 29/607 |
| 2008/0191578 | A1 * | 8/2008 | Evans ..................... | 310/217 |
| 2011/0309724 | A1 * | 12/2011 | Min et al. ................ | 310/425 |
| 2013/0002082 | A1 * | 1/2013 | Utsumi et al. .......... | 310/156.53 |

FOREIGN PATENT DOCUMENTS

| | | |
|---|---|---|
| JP | 9-200982 | 7/1997 |
| JP | 2003-304670 | 10/2003 |
| JP | 2011-6741 | 1/2011 |
| JP | 2011-67027 | 3/2011 |

OTHER PUBLICATIONS

U.S. Appl. No. 13/947,575, filed Jul. 22, 2013, Nagahama.

* cited by examiner

*Primary Examiner* — Hanh Nguyen
(74) *Attorney, Agent, or Firm* — Oblon, McClelland, Maier & Neustadt, L.L.P.

(57) ABSTRACT

At least part of each bridge portion is heated and molten to form a keyhole, and a nonmagnetic element is disposed around the keyhole. Thus, even when the width of the bridge portion in the radial direction is increased, the bridge portion is demagnetized. Therefore, leakage flux in the bridge portion is reduced, and the output power of a motor is increased. Moreover, by increasing the width of the bridge portion in the radial direction, the strength of the bridge portion is increased, and breakage of the bridge portion due to a centrifugal force at high-speed rotation of a rotor is prevented.

7 Claims, 5 Drawing Sheets

ROTOR FOR MOTOR AND METHOD OF MANUFACTURING THE SAME

INCORPORATION BY REFERENCE/RELATED APPLICATION

This application claims priority to Japanese Patent Application No. 2011-261351 filed on Nov. 30, 2011 the disclosure of which, including the specification, drawings and abstract, is incorporated herein by reference in its entirety.

BACKGROUND OF THE INVENTION

1. Field of the Invention

The invention relates to a rotor for a motor, and a method of manufacturing the rotor for a motor.

2. Discussion of Background

An interior permanent magnet synchronous motor (IPM) is a compact and high-power motor. In the IPM, rectangular parallelepiped-shaped slots that extend in the axial direction are formed in a rotor core obtained by laminating ferromagnetic plates, and permanent magnets are inserted into the slots. Reluctance torque is added to magnetic torque, and, as a result, large output power is obtained. However, each permanent magnet is in a rectangular parallelepiped-shape, and, hence, leakage flux that does not contribute to rotary torque is generated in a bridge portion located between the outer periphery of the rotor core and an end portion of each slot in the rotor core. In order to reduce the leakage flux, there may be employed a method in which the width of each bridge portion in the radial direction is decreased and an air gap is formed between each bridge portion and the permanent magnet. However, if the width of each bridge portion is small, the bridge portion may break due to a centrifugal force when a rotor rotates at a high-speed. Accordingly, there is another method of reducing the leakage flux. According to this method, each bridge portion is demagnetized.

For example, Japanese Patent Application Publication No. 2003-304670 (JP 2003-304670 A) describes a rotor for a motor, in which a nonmagnetic coating material that contains a nonmagnetic substance is applied to the outer periphery of each bridge portion of a rotor core obtained by laminating ferromagnetic plates and the nonmagnetic coating material is heated to diffuse and permeate into the bridge portions to demagnetize the bridge portions. Japanese Patent Application Publication No. 2011-6741 (JP 2011-6741 A) describes a rotor for a motor, which is formed in the following manner. A nonmagnetic ink that contains a nonmagnetic substance is applied to the surface of each bridge portion of one ferromagnetic plate, and the nonmagnetic ink is heated and molten to form an alloy to demagnetize the bridge portions. Then, the rotor is formed by laminating a plurality of the ferromagnetic plates. Japanese Patent Application Publication No. 2011-67027 (JP 2011-67027 A) describes a rotor for a motor, which is formed in the following manner. Concave portions are formed in bridge portions of two ferromagnetic plates, and a nonmagnetic alloy is placed in one of the concave portions. Then, the two ferromagnetic plates are laminated such that the concave portions face each other, and the ferromagnetic plates are pressurized and energized to form nonmagnetic alloy layers in the bridge portions. Subsequently, the rotor is formed by laminating a plurality of the ferromagnetic plates.

If the surface of a permanent magnet rubs against the inner face of a slot when the permanent magnet is inserted into the slot, flaws or cracks may be generated in the permanent magnet. Accordingly, Japanese Patent Application Publication No. 9-200982 (JP 9-200982 A) describes that an opening of each slot is formed to be larger than a slot insertion face of each permanent magnet, and the permanent magnet is inserted into the slot. Then, a portion of each ferromagnetic plate, which is located radially outward of the slots, is pressed radially inward to press the inner faces of the slots against the permanent magnets. As a result, the permanent magnets are fixedly held by the rotor core.

In the rotor for a motor described in JP 2003-304670 A, the nonmagnetic coating material is made to diffuse and permeate into the bridge portions from the outer periphery of each bridge portion. Accordingly, the nonmagnetic coating material does not easily permeate into the bridge portions in the radial direction. Therefore, it is difficult to increase the width of each bridge portion in the radial direction. Consequently, there is a possibility that the bridge portions may break due to a centrifugal force when the rotor rotates at a high-speed. Further, it is necessary to form, in the ferromagnetic plates, fixing portions such as swaged portions for fixing the ferromagnetic plates to each other when a plurality of the ferromagnetic plates is laminated. When the fixing portions are formed, insulating films of the ferromagnetic plates break and the fixing portions become conductive. Therefore, the fixing portions should be formed preferably in the bridge portions that are less influenced by the conduction. However, it is not possible to form the fixing portions in the bridge portions that have a small width in the radial direction.

In the rotor for a motor described in JP 2011-6741 A, the nonmagnetic substance is molten to form the alloy on the surface of each bridge portion. In the rotor for a motor described in JP 2011-67027 A, the nonmagnetic alloy is placed in the concave portion formed in the bridge portion to form the nonmagnetic alloy layer. Therefore, in these rotors, it is possible to increase the width of each bridge portion in the radial direction. However, it is necessary to laminate a plurality of the ferromagnetic plates after performing demagnetization of the bridge portions for every one plate or every two plates. This takes a lot of time and increases the cost.

In the rotor for a motor described in JP 9-200982 A, the portion of each ferromagnetic plate, which is located radially outward of the slots, is pressed radially inward and the bridge portions are plastically deformed to press the inner faces of the slots against the permanent magnets. In this method, the surfaces of the permanent magnets do not rub against the inner faces of the slots, and hence there is no possibility that flaws or cracks will be generated in the permanent magnets. However, if the width of each bridge portion in the radial direction is increased, a tensile strength of each bridge portion is increased. This makes it difficult to plastically deform the bridge portions, which may cause a problem that the permanent magnets are not fixedly held by the rotor core.

SUMMARY OF THE INVENTION

The invention provides a rotor for a motor, in which the width of each bridge portion in the radial direction is increased and leakage flux in the bridge portion is reduced, and a method of manufacturing the rotor. The invention also provides a method of manufacturing a rotor for a motor, by which a permanent magnet is fixedly held by a rotor core with magnetic characteristics of the permanent magnet appropriately maintained.

According to a feature of an example of the invention, at least part of each bridge portion is irradiated with high-density energy and heated to form a keyhole, and a nonmagnetic element disposed in a molten pool around the keyhole is formed into a solid solution alloy to demagnetize the at least part of the bridge portion.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

The configuration of a rotor used in a motor will be described below. As a rotor for a motor, a rotor of an interior permanent magnet synchronous motor (IPM) will be described with reference to FIG. 1. In the following description, "radial direction" and "axial direction" represent the radial direction and the axial direction of the rotor (rotor core), respectively.

Figure 1:
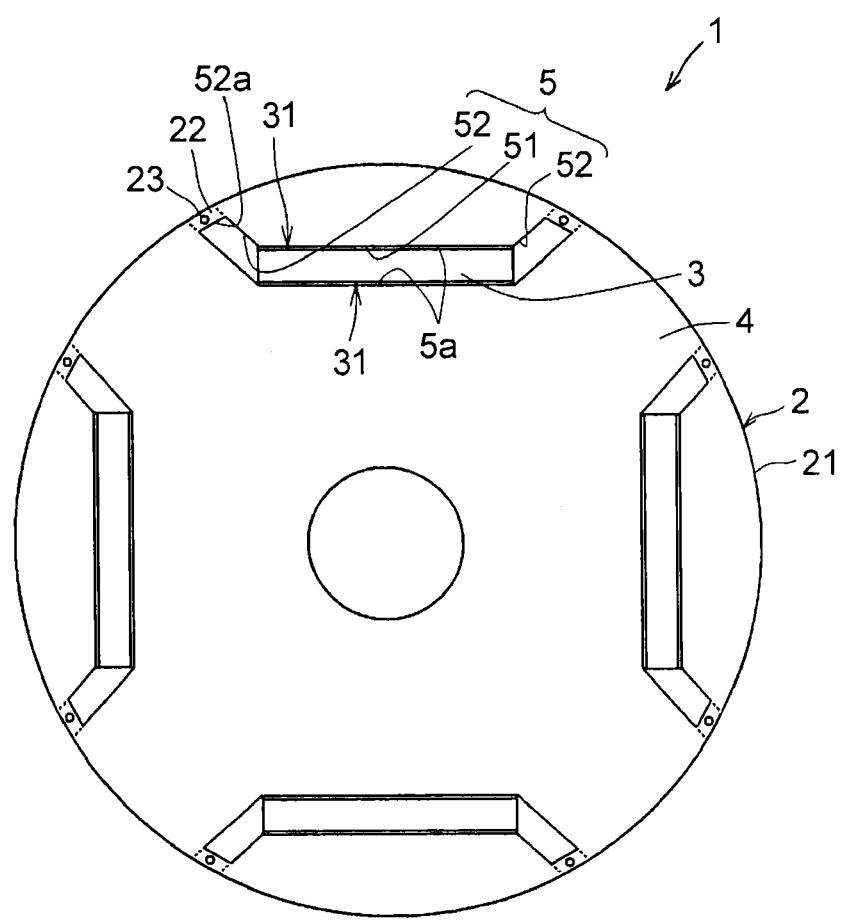
FIG. 1 is a plan view of a rotor for a motor.

As shown in FIG. 1, a rotor 1 includes a rotor core 2 and four permanent magnets 3. The rotor core 2 is formed by laminating a plurality of thin disc-shaped ferromagnetic plates 4 that are, for example, magnetic steel plates. The four permanent magnets 3 are, for example, neodymium magnets, and each of the permanent magnets 3 is formed in a rectangular parallelepiped-shape and disposed in the rotor core 2. That is, the permanent magnets 3 are accommodated in respective four slots 5 that are formed near an outer periphery 21 of the rotor core 2 at angular intervals of 90 degrees and that extend through the rotor core 2 in the axial direction. The permanent magnets 3 are fixedly held by the rotor core 2 through a magnet fixedly holding step described later.

Each of the four slots 5 has a rectangular opening 51 and trapezoidal openings 52 that extend from respective ends of the rectangular opening 51 toward the outer periphery 21 of the rotor core 2. The trapezoidal openings 52 are formed as air gaps against magnetism.

Figure 2:
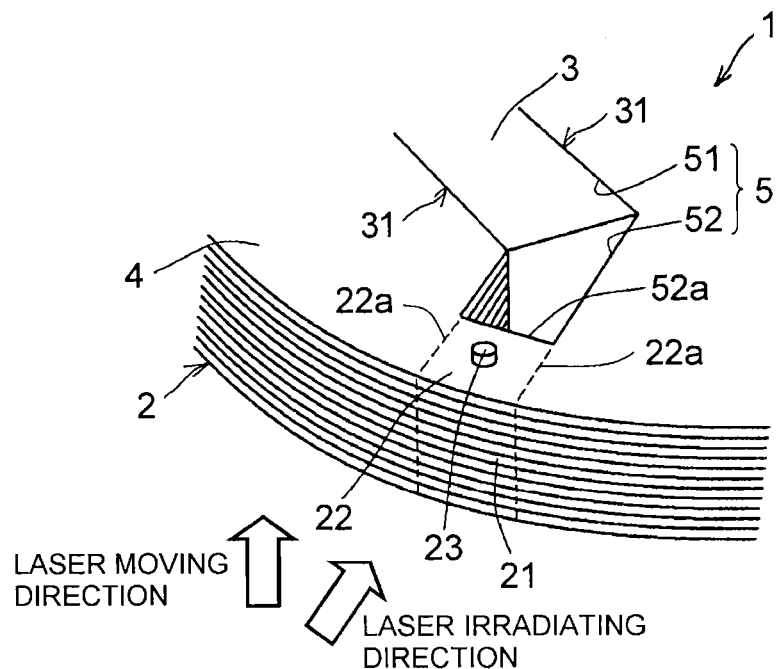
FIG. 2 is a partially enlarged perspective view showing a first state in which a fixing portion is formed.

As shown in FIG. 1 and FIG. 2, between the outer periphery 21 of the rotor core 2 and a radially outer-side face 52a of the trapezoidal opening 52, there is formed a bridge portion 22 (a region sandwiched by two broken lines 22a in FIGS. 1 and 2) that is entirely demagnetized. In a demagnetization process, as described later in detail, each bridge portion 22 is heated and molten to form a keyhole, and a nonmagnetic element is disposed around the keyhole. The bridge portions 22 are provided with fixing portions 23 such as swaged portions for fixing a plurality of the laminated ferromagnetic plates 4 to each other.

Figure 3:
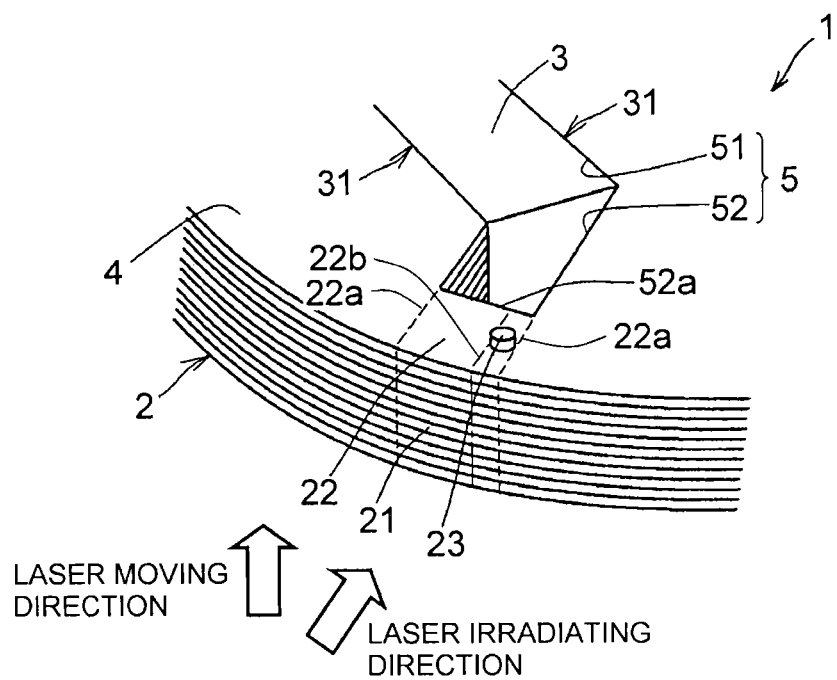
FIG. 3 is a partially enlarged perspective view showing a second state in which the fixing portion is formed.

As shown in FIG. 2, each fixing portion 23 is formed within the demagnetized region in the bridge portion 22. However, as shown in FIG. 3, each fixing portion may be formed at a position in the bridge portion 22 but outside the demagnetized region. That is, part of the bridge portion 22 (a region sandwiched by the left broken line 22a and a one-dot chain line 22b in FIG. 3) is demagnetized, but the remaining part of the bridge portion 22 (a region sandwiched between the right broken line 22a and the one-dot chain line 22b in FIG. 3) is not demagnetized, and the fixing portion 23 may be formed in the remaining part of the bridge portion 22.

Figure 4:
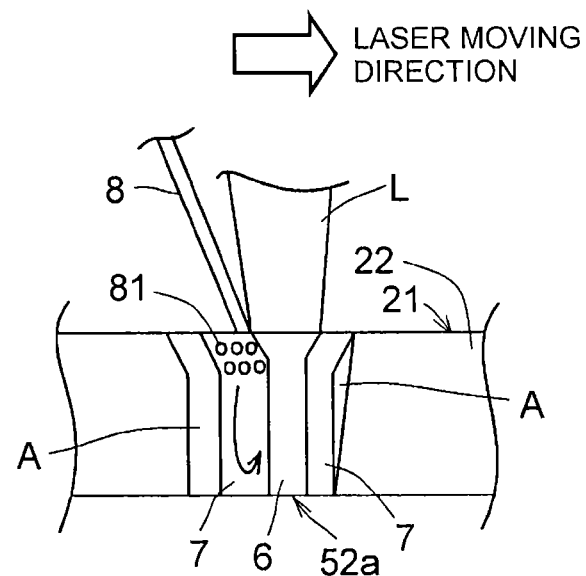
FIG. 4 is a schematic sectional view for illustrating a method of demagnetizing a bridge portion.
Figure 5:
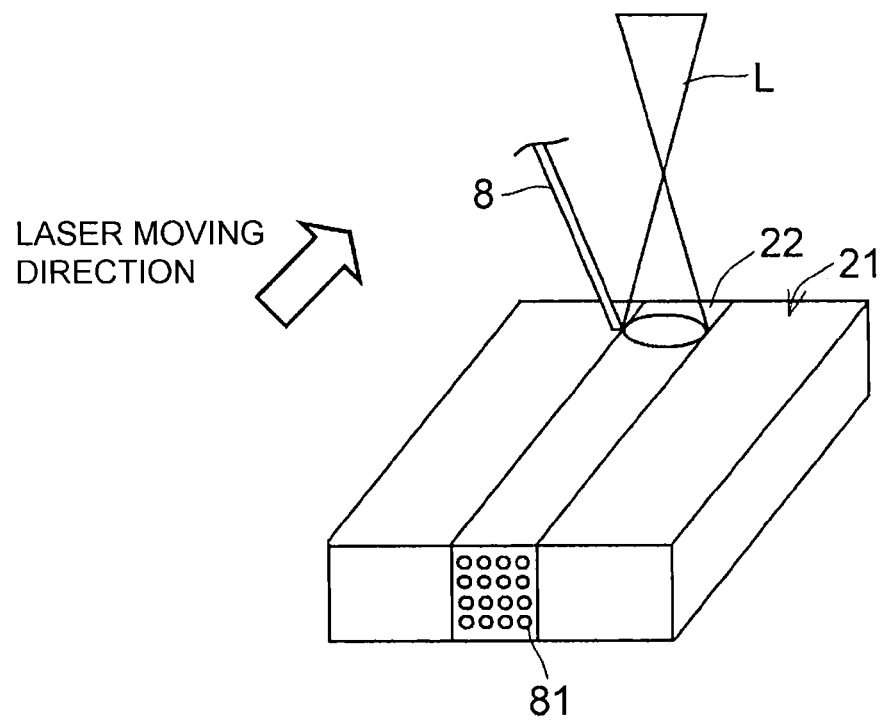
FIG. 5 is a schematic perspective view for illustrating the method of demagnetizing the bridge portion.

The process of demagnetizing the bridge portions 22 will be described with reference to FIG. 4 and FIG. 5. The demagnetization process includes a keyhole forming step and an element disposing step. In the keyhole forming step, each bridge portion 22 of the rotor core 2 is irradiated with a laser L from the outer periphery of the bridge portion 22 (the outer periphery 21 of the rotor core 2) to form a keyhole 6. The keyhole 6 is a round hole that is formed through irradiation of the bridge portion 22 with the laser L, and that extends through the bridge portion 22, which is irradiated with the laser L, from the outer periphery to the inner periphery (the radially outer-side face 52a of the trapezoidal opening 52). When the keyhole 6 is formed, vaporized metal is generated, and a molten pool 7 is formed around the keyhole 6 by a metal vaporization pressure and a base material surface tension.

In the element disposing step, a nonmagnetic element (e.g. manganese or nickel) 81 is disposed in the molten pool 7 around the keyhole 6 and is formed into a solid solution alloy. A wire 8 made of the nonmagnetic element 81 is disposed near a laser L irradiating position on the outer periphery of the bridge portion 22. Then, the laser L irradiating position is moved relative to the outer periphery of the bridge portion 22, and the wire 8 is also moved relative to the outer periphery of the bridge portion 22 in accordance with the movement of the laser L irradiating position. When the laser L irradiating position moves relative to the outer periphery of the bridge portion 22, the keyhole 6 at a preceding irradiating position is filled with the molten bridge portion 22. A heat-affected portion A affected by heat is formed around the molten pool 7.

The wire 8 contacts the molten pool 7 and is molten, and the molten wire 8 (i.e. the nonmagnetic element 81) is mixed and diffused into the molten pool 7. In the molten pool 7, convection (see an arrow of FIG. 4) is easily generated, and hence the nonmagnetic element 81 is diffused in the radial direction of the bridge portion 22, and supplied from the outer periphery to the inner periphery of the bridge portion 22. In this way, the bridge portion 22 is alloyed and changed into a nonmagnetic material evenly in the radial direction from the outer periphery to the inner periphery in substantially the constant width.

Figure 6:
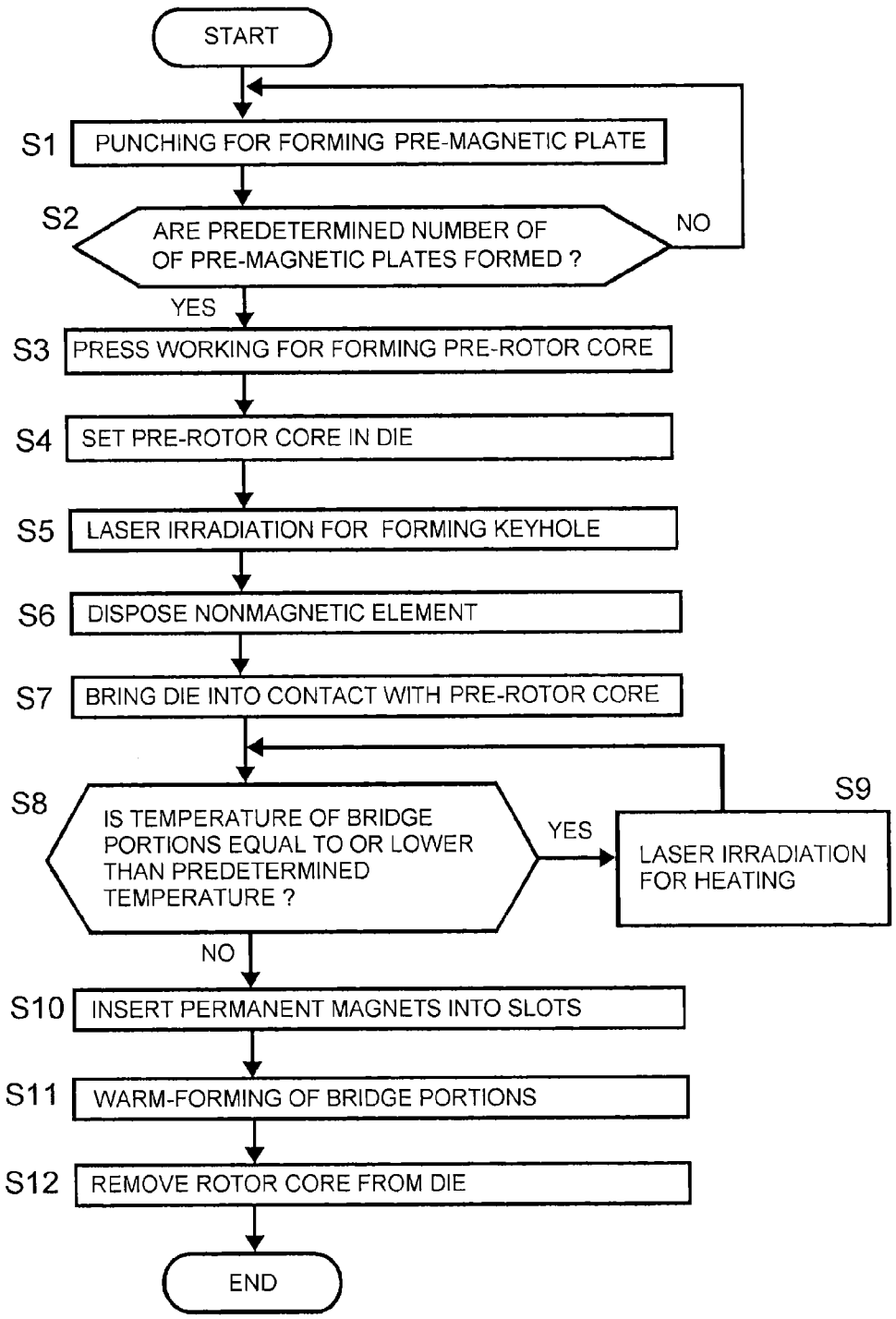
FIG. 6 is a flowchart for describing a method of manufacturing a rotor core.

A method of manufacturing the rotor 1 will be described with reference to a flowchart of FIG. 6. In this method, a press device (not shown) and a press device with a laser device (not shown) are used. The press device is a known device that performs a punching step for preparing a pre-ferromagnetic plate 40 described later, and a pressurizing step for preparing a pre-rotor core 20 described later. The press device with a laser device is a device that performs a demagnetization step for demagnetizing the bridge portions 22 of the rotor core 2, and a magnet fixedly holding step for fixing, to the rotor core 2, the permanent magnets 3 accommodated in the slots 5 of the rotor core 2. A die 9 of the press device with a laser device has a cylindrical shape having an inner diameter that is equal to the outer diameter of the rotor core 2, and is split into four pieces (split dies 91) at angular intervals of 90 degrees in the radial direction. The split dies 91 are configured to be moved in the radial direction by a moving device (not shown) to pressurize the pre-rotor core 20 (see FIG. 7 and FIG. 8).

The magnetic steel plate is set on the press device, and punched into a shape (see FIG. 7) of the pre-ferromagnetic plate 40 prior to the magnet fixedly holding step (step S1). The pre-ferromagnetic plate 40 has such a shape that a portion radially outward of each slot 5 bulges radially outward with respect to the bridge portions 22 on both sides. The punched pre-ferromagnetic plate 40 drops down to be accommodated in a die. When a predetermined number of pre-ferromagnetic plates 40 are punched and laminated in the die (step S2), the laminated pre-ferromagnetic plates 40 are pressed in the axial direction and fixed to each other by the fixing portions 23. As a result, the pre-rotor core 20 prior to the magnet fixedly holding step is obtained (step S3).

Figure 7:
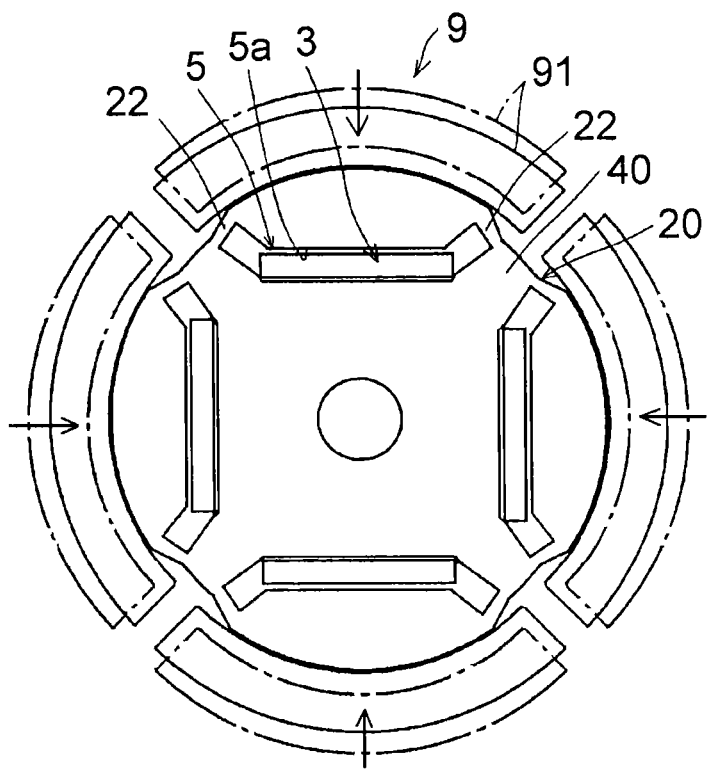
FIG. 7 is a plan view showing a state before permanent magnets are fixed.

Next, as shown in FIG. 7, the split dies 91 of the press device with a laser device are moved radially outward, and the pre-rotor core 20 is set at the center of the space defined by the split dies 91 (step S4). Then, each bridge portion 22 of the pre-rotor core 20 is irradiated with the laser L to form the keyhole 6 (step S5), and the wire 8 made of, for example, manganese is disposed to supply the manganese (step S6: an example of "demagnetization step" in the invention). Then, the laser irradiation position and the wire 8 are moved in the axial direction to demagnetize the bridge portion 22. At this time, the temperature of the bridge portion 22 reaches, for example, 1600° C.

Next, the split dies 91 of the press device with a laser device are moved radially inward until the split dies 91 contact the pre-rotor core 20 (step S7). As a result, heat is transferred from the pre-rotor core 20 to the split dies 91, and hence the temperature of each bridge portion 22 is reduced. Then, it is determined whether the temperature of the bridge portion 22 is equal to or lower than a predetermined temperature within a range, for example, from 500° C. to 700° C. (step S8). When the temperature of the bridge portion 22 is equal to or lower than the predetermined temperature, the bridge portion 22 is irradiated with the laser L to be heated (step S9). When the temperature of each bridge portion 22 is higher than the predetermined temperature, the permanent magnets 3 are inserted into the respective slots 5 of the pre-rotor core 20 (step S10). Then, the split dies 91 of the press device with a laser device are moved further radially inward to pressurize the pre-rotor core 20 radially inward. In this way, warm-forming of the bridge portions 22 is performed (step S11: an example of "magnet fixedly holding step" in the invention).

Figure 8:
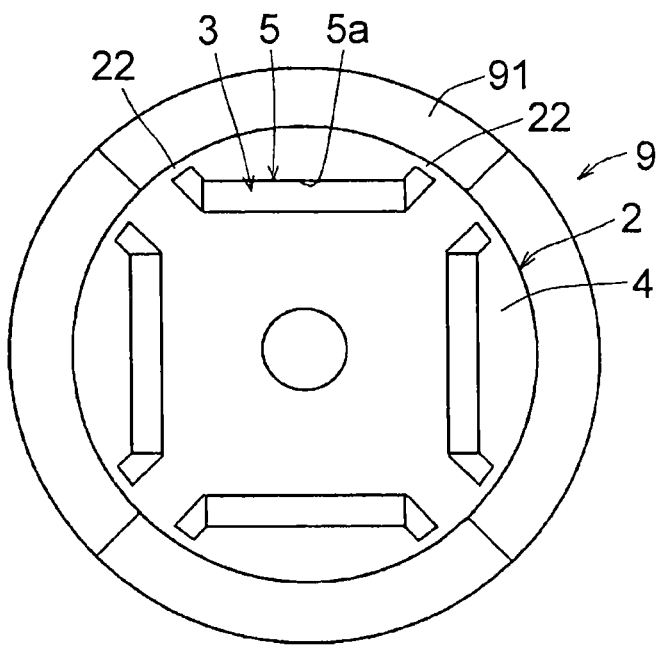
FIG. 8 is a plan view showing a state after the permanent magnets are fixed.

As a result, the bridge portions 22 are plastically deformed. When the split dies 91 finally contact each other to form a cylindrical shape as shown in FIG. 8, the pre-rotor core 20 is formed into a shape of the rotor core 2. At this time, inner faces 5a of the slots 5 are pressed against the permanent magnets 3, and hence the permanent magnets 3 are fixedly held by the rotor core 2. When the temperature of each bridge portion 22 is equal to or lower than, for example, 500° C., the bridge portion 22 is irradiated with the laser L to be heated again (an example of "bridge heating step" in the invention). In this case, an amount of the heat that is applied to each bridge portion 22 is made smaller than that when the keyhole is formed, by shortening a laser irradiation time or reducing the laser output. If the split dies 91 are heated to substantially the same temperature as that of the bridge portions 22, for example, a temperature within the range from 500° C. to 700° C., the temperature of the bridge portions 22 is kept sufficiently high and the bridge portions 22 are thermally deformed smoothly. Then, the split dies 91 of the press device with a laser device are moved radially outward, and the rotor core 2 is removed from the die 9 (step S12). In this way, the rotor core 2 is obtained.

Note that in the technical field of welding, a keyhole is a deep small hole formed during welding such as laser welding, electron beam welding or arc welding. When multiple members are welded together, a keyhole is formed in one of the members to weld the one member to the other member. Specifically, when a heat such as a laser is applied to the surface of the one member, the keyhole is formed in the one member to weld the back surface side of the one member to the front surface side of the other member. However, the keyhole 6 formed in the demagnetization process differs from the keyhole used in the keyhole welding for welding multiple layers together, in that the keyhole 6 is formed in each single-layered bridge portion 22 to magnetically reform the bridge portion 22 evenly from the outer periphery to the inner periphery thereof, regardless of the thickness of the bridge portion 22. As described above, the technical field of the welding is completely different from the technical field of magnetic reforming.

The operation and advantageous effects of the rotor for a motor will be described below. By irradiating at least part of each bridge portion 22 with high-density energy to heat the at least part of each bridge portion 22, the keyhole 6 is formed by the metal vaporization pressure and the base material surface tension. Further, by forming the nonmagnetic element disposed in the molten pool 7 around the keyhole 6 into a solid solution alloy, each bridge portion 22 is demagnetized. In this way, even if the width of the bridge portion 22 in the radial direction is increased, the bridge portion 22 is demagnetized. As a result, the leakage flux in each bridge portion 22 is reduced, and the output power of the motor is increased. Further, because the width of each bridge portion 22 in the radial direction is increased, the strength of the bridge portion 22 is enhanced and the bridge portion 22 is prevented from being broken by a centrifugal force when the rotor 1 rotates at a high speed.

After the ferromagnetic plates 4 are fixed to each other by the fixing portions 23, each bridge portion 22 is irradiated with high-density energy and heated to form the keyhole by the metal vaporization pressure and the base material surface tension, and the nonmagnetic element disposed in the molten pool 7 around the keyhole 6 is formed into a solid solution alloy to demagnetize each bridge portion 22. As a result, thermal deformation of the rotor core 2 is suppressed. Furthermore, because the bridge portions 22 are provided with the fixing portions 23, thermal deformation of the bridge portions 22 is prevented. When the fixing portions 23 are formed, the insulating films of the ferromagnetic plates 4 may break. However, the insulating films of the bridge portions 22 are molten by heating and melting the bridge portions 22, and portions of the ferromagnetic plates 4 within the demagnetized regions are not insulated. Therefore, the fixing portions 23 and the demagnetized regions become conductive. Therefore, it is possible to suppress conduction in the rotor core 2 as a whole due to breakage and melting of the insulating films more efficiently when the fixing portions 23 are formed in the demagnetized regions of the bridge portions 22, than when the fixing portions 23 are formed in regions of the bridge portions 22 other than the demagnetized regions. This is because if the fixing portions 23 are formed in the demagnetized regions, only the demagnetized regions become conductive. When the fixing portions 23 are formed in the regions of the bridge portions 22 other than the demagnetized regions, it is possible to eliminate the influences of the fixing portions 23 in the demagnetization process.

The tensile strength of a metal material is reduced as the material temperature increases. Therefore, when the temperature of the metal material is high, plastic forming of the metal material is easily performed. Therefore, even when the temperature of each bridge portion 22 becomes lower than the high temperature in the demagnetization process, if the temperature thereof is equal to or higher than a predetermined temperature, it is possible to plastically deform the bridge portions 22 easily. Therefore, the permanent magnets 3 are fixedly held by the rotor core 2 with reliability. Moreover, the air gap between each permanent magnet 3 and the rotor core 2 is reduced, and hence the motor output power is increased. Furthermore, the opening 51 of each slot 5 is made larger than a slot insertion face 31 of the permanent magnet 3. Therefore, when the permanent magnets 3 are inserted into the slots 5, the permanent magnets 3 do not rub against the inner faces 5a of the slots 5. As a result, flaws and cracks of the permanent magnets 3 are prevented.

The invention may be implemented in the following alternative embodiments. In the above-described embodiment, the wire 8 made of the nonmagnetic element 81 is disposed near the laser L irradiating position on the outer periphery of the bridge portion 22, and the nonmagnetic element 81 is supplied to the molten pool 7 formed around the keyhole 6 to perform the demagnetization process. Alternatively, the demagnetization process may be performed in the following method. That is, pellets made of the nonmagnetic element 81 are placed on the bridge portions 22, the pellets made of the nonmagnetic element 81 are driven into the bridge portions 22 through press working, and the pellets made of the nonmagnetic element 81 are irradiated with the laser L to perform the demagnetization process. Further alternatively, powder, coarse particles or thin films made of the nonmagnetic element 81 are placed on the bridge portions 22, and the powder, the coarse particles, or the thin films made of the nonmagnetic element 81 are irradiated with the laser L to perform the demagnetization process. In addition, means for forming the keyhole 6 may be any means as long as high-density energy is emitted. In place of the laser L, for example, electron beams may be used.

Moreover, in the above-described embodiment, each bridge portion 22 is subjected to the demagnetization process by forming the keyhole 6. Alternatively, the demagnetization process may be performed in a different manner, and then the following process may be performed. That is, the bridge portions 22 of the pre-rotor core 20 set in the die 9 of the press device with a laser device are heated (an example of "bridge heating step" in the invention). Next, when the temperature of each bridge portion 22 becomes higher than a predetermined temperature within a range, for example, from 500° C. to 700° C., the permanent magnets 3 are inserted into the respective slots 5 of the pre-rotor core 20 (an example of "magnet fixedly holding step" in the invention). Then, the split dies 91 of the press device with a laser device are moved further radially inward to pressurize the pre-rotor core 20 radially inward (an example of "magnet fixedly holding step" in the invention). In this way, the bridge portions 22 are plastically deformed and the split dies 91 finally contact each other to form a cylindrical shape. As a result, the pre-rotor core 20 is formed into the shape of the rotor core 2.

As described above, by heating the bridge portions 22, the bridge portions 22 are easily deformed plastically, and the permanent magnets 3 are fixedly held by the rotor core 2 with reliability. Moreover, because the air gap between each permanent magnet 3 and the rotor core 2 is reduced, the motor output power is increased. Furthermore, the opening 51 of each slot 5 is made larger than the slot insertion face 31 of the permanent magnet 3. Therefore, when the permanent magnets 3 are inserted into the slots 5, the permanent magnets 3 do not rub against the inner faces 5a of the slots 5, and flaws and cracks of the permanent magnets 3 are prevented.

What is claimed is:

1. A rotor for a motor, comprising:
   a rotor core that is formed of a plurality of laminated ferromagnetic plates; and
   a permanent magnet that is accommodated in a slot that is formed in the rotor core so as to extend in an axial direction of the rotor core,
   wherein at least part of a bridge portion between an outer periphery of the rotor core and an end portion of the slot is heated by high-density energy to form a keyhole and form a molten pool around the keyhole, and a nonmagnetic element is disposed in the molten pool to demagnetize the at least part of the bridge portion.

2. The rotor for a motor according to claim 1, wherein the bridge portion is provided with a fixing portion for fixing the plurality of laminated ferromagnetic plates together.

3. The rotor for a motor according to claim 2, wherein the fixing portion is formed in a demagnetized region of the bridge portion.

4. The rotor for a motor according to claim 2, wherein the fixing portion is formed in a region of the bridge portion other than a demagnetized region.

5. The rotor for a motor according to claim 1, wherein the permanent magnet is pressed against inner faces of the slot and fixedly held by the rotor core, by pressing and deforming the outer periphery of the rotor core radially inward after the at least part of the bridge portion is demagnetized.

6. A method of manufacturing a rotor for a motor, the rotor including a rotor core that is formed of a plurality of laminated ferromagnetic plates, and a permanent magnet that is accommodated in a slot that is formed in the rotor core so as to extend in an axial direction of the rotor core,
   wherein at least part of a bridge portion between an outer periphery of the rotor core and an end portion of the slot is heated by high-density energy to form a keyhole and form a molten pool around the keyhole, and a nonmagnetic element is disposed in the molten pool to demagnetize the at least part of the bridge portion.

7. A method of manufacturing a rotor for a motor, the rotor including a rotor core that is formed of a plurality of laminated ferromagnetic plates, and a permanent magnet that is accommodated in a slot that is formed in the rotor core so as to extend in an axial direction of the rotor core,
   the manufacturing method comprising:
   a demagnetization step in which at least part of a bridge portion between an outer periphery of the rotor core and an end portion of the slot is heated by high-density energy to form a keyhole and form a molten pool around the keyhole, and a nonmagnetic element is disposed in the molten pool to demagnetize the at least part of the bridge portion; and
   a magnet fixedly holding step which is performed after the demagnetization step and in which the outer periphery of the rotor core is pressed and deformed radially inward to press inner faces of the slot against the permanent magnet, thereby causing the permanent magnet to be fixedly held by the rotor core.

* * * * *